May 6, 1924.
E. S. HALL
TOGGLE BOLT
Filed June 8, 1922
1,493,197
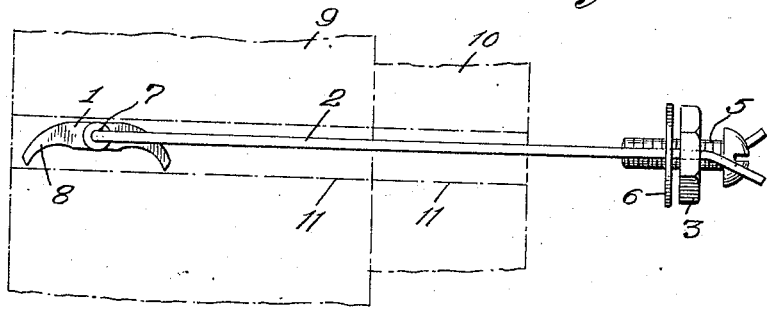
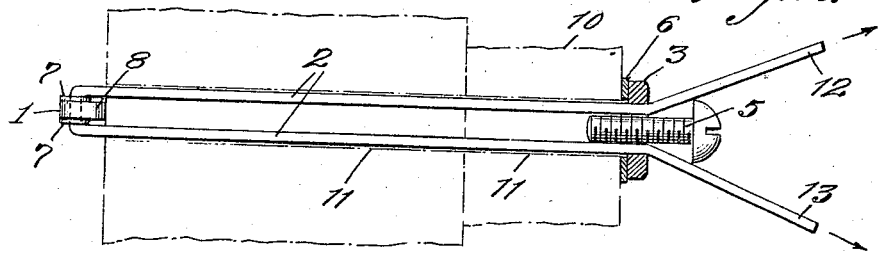
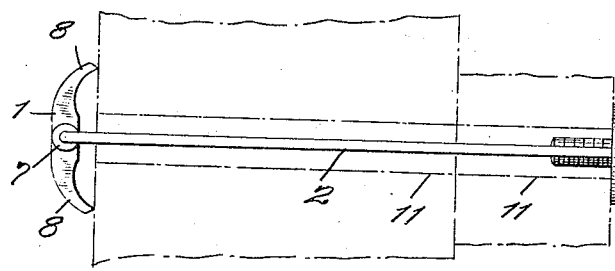
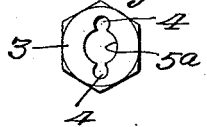
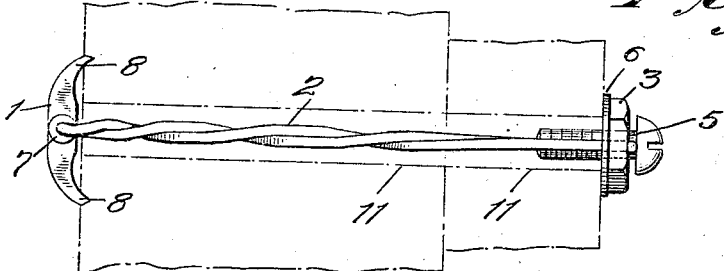
INVENTOR
Edward Spencer Hall
BY
ATTORNEYS Patented May 6, 1924.

1,493,197

UNITED STATES PATENT OFFICE.

EDWARD SPENCER HALL, OF HIGHLANDS, NEW JERSEY.

TOGGLE BOLT.

Application filed June 8, 1922. Serial No. 566,709.

*To all whom it may concern:*

Be it known that I, EDWARD SPENCER HALL, a citizen of the United States, residing at Highlands, county of Monmouth, State of New Jersey, have invented certain new and useful Improvements in Toggle Bolts, of which the following is a specification.

This invention relates to toggle bolts and has for its primary object to provide a bolt having a shank formed of flexible wire or other tensile material, which may be twisted so as to draw the head and anchor elements of the bolt toward each other and thus provide a very effective grip on the parts held together by the bolt.

A good understanding of the invention may be had from the following description of the preferred form of embodiment thereof, reference being had to the accompanying drawings, in which, Figure 1 illustrates, in elevation, a toggle bolt constructed in accordance with my invention, the same being shown in the act of being inserted into position;

Figure 2 is a plan view of the toggle bolt of Figure 1, showing one step in the method of securing the toggle bolt in place;

Figures 3 and 4 are side elevations of the toggle bolt showing subsequent steps in the method of securing the bolt in place; and Figure 5 is a plan view of the member 3 of the bolt.

Similar characters of reference designate similar parts in each of the several views.

The toggle bolt of the present invention consists of an anchor element 1 pivoted freely on a shank 2 comprised of wire or other suitable flexible tensile material, this wire being passed through an opening in anchor 1 and the ends of the wire being passed through openings 4 in a member 3, which, together with a machine screw 5, constitutes the head element of the bolt. The machine screw cooperates with a threaded opening 5ª in member 3 and a washer 6 serves to furnish a bearing surface between the said member and the part to which the bolt is applied. The anchor 1 is provided with hubs 7 for the purpose of preventing the anchor from sliding off the end portion of the wire and for increasing the bearing surface between the wire and the anchor. The hub, moreover, serves to space the prongs 8 of the anchor from the wires 2 of the shank, so that the said prongs are free to enter between the wires when the anchor is turned on the shank into the position indicated in Figure 1. If preferred, the entire anchor element may be made of the same thickness as the belt portion.

The operation and use of the device will now be described with reference to the parts 9 and 10 indicated in dot-and-dash lines in the drawing, which parts are to be secured to each other by means of the toggle bolt. For this purpose the two parts are provided with coaxial holes 11 through which the end of the toggle bolt may be passed, the anchor element being turned into alignment with the shank, as indicated in Figure 1. When the anchor element has been passed entirely through the opening 11, the bolt is so manipulated that the anchor swings out of alignment with the shank and engages the rear wall of the member 9, as indicated in Figures 2 and 3. The free ends 12 and 13 of the wire are then grasped by suitable tools, such as pliers, and pulled in directions such as approximately indicated by the arrows in Figure 2, so that the prongs of the anchor are caused to enter slightly within the material of part 9, and the member 3 is caused to slide into engagement with the outer surface of member 10. A screw driver is then employed for inserting the screw 5 further into the member 3, the result of this operation being to bend over ends 12 and 13 against the surface of member 3. The head of the screw thus clamps the end of the wire firmly in position. The protruding ends may then be cut off, if necessary.

At the end of the above operation, the position of the bolt will be substantially as indicated in Figure 3. The operator now continues to turn the screw 5 with his screw driver, with the result that the member 3 is caused to rotate with the screw. The anchor 1, however, is prevented from turning because the prongs 8 dig into the material of the part 9. As a result of this operation, therefore, the wires 2 are twisted together, as illustrated in Figure 4, thus causing the anchor 8 to embed itself further and causing the parts 9 and 10 to be drawn into extremely firm engagement with each other. The result of this operation is thus to produce a very effective hold between parts 9 and 10.

It will be observed that the member 3 of the foregoing description is preferably, although not necessarily, in the form of a nut, as illustrated in the drawing, so that the operation of twisting the wires of the shank may be performed, if desired, by applying turning force directly to the nut, as by means of a wrench.

It will be observed that the present form of toggle bolt has the advantage of being extremely simple in form and extraordinarily cheap in manufacture. Moreover, it has the important advantage over the toggle bolts of the prior art, of requiring a hole of only small diameter through the parts which are to be secured together, and is of such form of construction that the maximum securing effect is obtained with the minimum of material.

Although I have herein shown and described only a specific form of embodiment of the invention, it will be readily understood that many changes and modifications may be made therein within the spirit and scope of the following claims, without departing from the spirit and scope of the invention, it being my intention to claim the same as broadly as the state of the prior art will permit.

What I claim is:

1. In a toggle bolt, an anchor element, a head element, a shank for associating said elements, said shank comprising a plurality of tensile members adapted for being twisted together by turning the head element for drawing said elements toward each other.

2. In a toggle bolt, a shank comprising a pair of tensile members, an anchor element pivotally associated with said shank, a head element adjustable on said shank, means for securing said head element in adjusted position, and means whereby said head element may be rotated relative to said anchor element so as to cause said elements to be drawn toward each other.

3. In a toggle bolt, a shank comprising a pair of flexible wires, an anchor element pivoted on said wires, a member slidable on said shank, means cooperating with said member for clamping said member in adjusted position, and means for causing rotation of said member relatively to said anchor element, whereby said wires may be twisted to draw said member toward said anchor.

4. In a toggle bolt, an anchor element, a length of wire having said anchor element pivoted thereon adjacent the middle of said wire, a member provided with a pair of openings for receiving the ends of said wires and permitting adjustment of the position of said member on said wires, a clamping device cooperating with said member for permitting said member to be locked on said wires in fixed position, said means comprising a member in threaded engagement with said first-mentioned member and having a surface for clamping said wires between said members.

In testimony whereof I have affixed my signature to this specification.

EDWARD SPENCER HALL.